US012600227B2

(12) United States Patent
Winter

(10) Patent No.: US 12,600,227 B2
(45) Date of Patent: Apr. 14, 2026

(54) FLAP ACTUATOR

(71) Applicant: Minebea Mitsumi Inc., Nagano (JP)

(72) Inventor: Andreas Winter, Munich (DE)

(73) Assignee: MINEBEA MITSUMI, INC., Nagano (JP)

( * ) Notice: Subject to any disclaimer, the term of this patent is extended or adjusted under 35 U.S.C. 154(b) by 414 days.

(21) Appl. No.: 18/362,023

(22) Filed: Jul. 31, 2023

(65) Prior Publication Data

US 2024/0034146 A1 Feb. 1, 2024

(30) Foreign Application Priority Data

Aug. 1, 2022 (DE) .......................... 102022119252.0

(51) Int. Cl.
B60K 15/05 (2006.01)
(52) U.S. Cl.
CPC ........ B60K 15/05 (2013.01); *B60K 2015/053* (2013.01); *B60K 2015/0546* (2013.01); *B60K 2015/0576* (2013.01)
(58) Field of Classification Search
CPC ...... B60K 2015/053; B60K 2015/0576; B60K 2015/0515; B60K 2015/0569; B60K 15/05; E05Y 2900/534; B60J 1/14; B60J 1/16; E05D 15/101; E05D 15/34; E05D 2015/1031; E05F 15/649
See application file for complete search history.

(56) References Cited

U.S. PATENT DOCUMENTS

2022/0213728 A1* 7/2022 Ilardo ................... B60K 15/05

FOREIGN PATENT DOCUMENTS

| DE | 102015008324 A1 | 1/2017 | |
|----|-----------------|--------|------------|
| EP | 0558995 B1 * | 10/1995 | ............... G05G 5/06 |
| EP | 2761118 B1 * | 1/2017 | ............... E05F 5/02 |

* cited by examiner

*Primary Examiner* — Amy R Weisberg
(74) *Attorney, Agent, or Firm* — Grossman, Tucker, Perreault & Pfleger, PLLC

(57) ABSTRACT

The flap actuator comprises a flap, an actuating drive for opening and closing the flap, and a linkage mechanism comprising a toggle joint comprising a first and second legs rotatably supported at a first and second rotation point, respectively, and rotatably connected to each other at a third rotation point. The second leg includes a guiding slot. The first leg includes a guiding projection engaged and moveably supported in the guiding slot. The toggle joint further comprises an elastic element, which exerts a force on the toggle joint when the flap is closed so the toggle joint causes a restoring force on the flap in the closing direction. Alternatively, or additionally, the guiding slot has a length greater than its width, and the projection is at least partially engaged with the first recess when the flap is closed causing a retaining force and/or a restoring force on the closed flap.

20 Claims, 11 Drawing Sheets 187     185     191     183     186

323     189,193     321

187     185     191     186     183

323     321     189,193

185     191

$L$ $Br_1$     $Br$     $Br_2$

323     $Pos_1$     321     $Pos_2$

Fig. 16

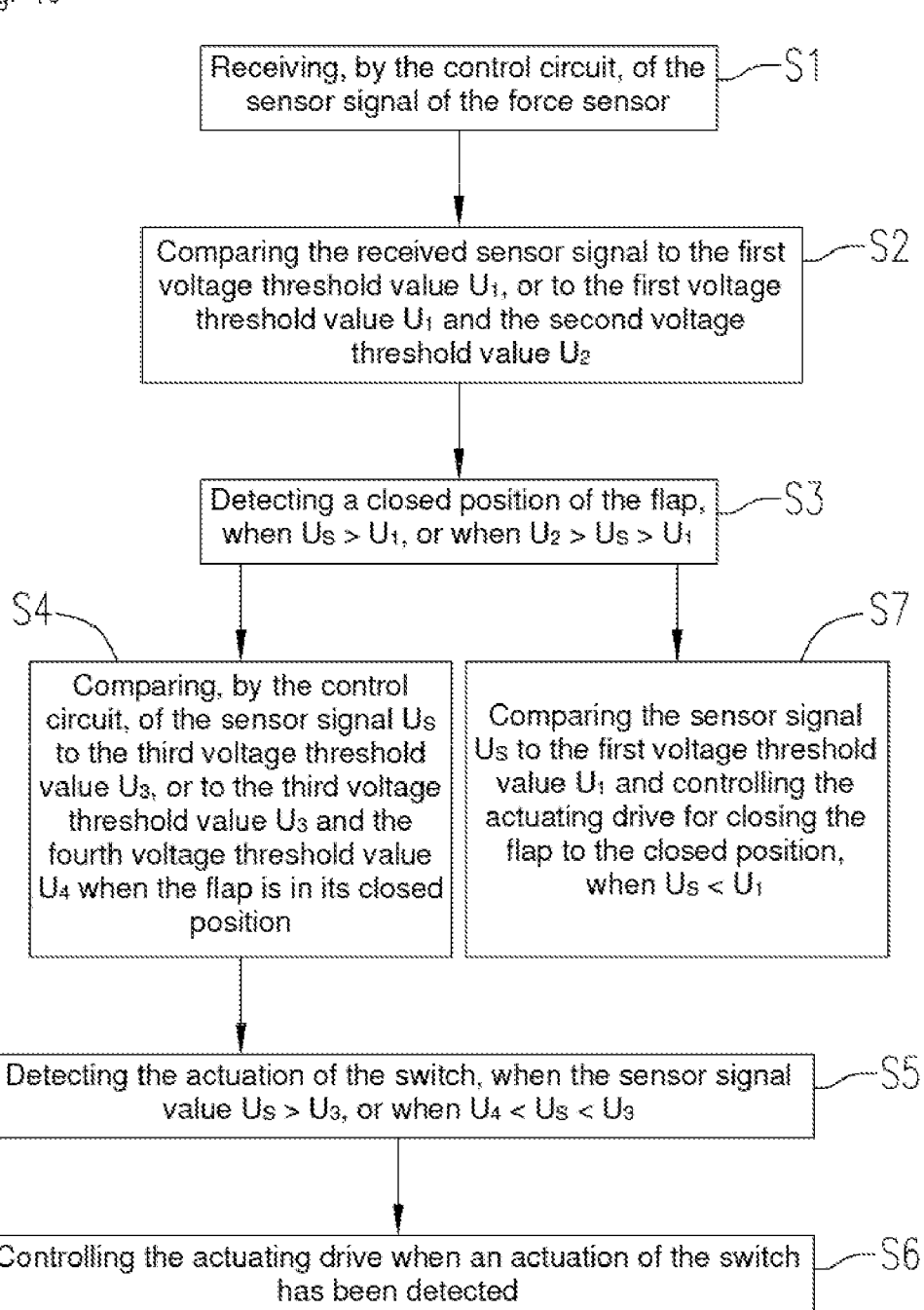

Receiving, by the control circuit, of the sensor signal of the force sensor — S1

Comparing the received sensor signal to the first voltage threshold value $U_1$, or to the first voltage threshold value $U_1$ and the second voltage threshold value $U_2$ — S2

Detecting a closed position of the flap, when $U_S > U_1$, or when $U_2 > U_S > U_1$ — S3

S4 — Comparing, by the control circuit, of the sensor signal $U_S$ to the third voltage threshold value $U_3$, or to the third voltage threshold value $U_3$ and the fourth voltage threshold value $U_4$ when the flap is in its closed position S7 — Comparing the sensor signal $U_S$ to the first voltage threshold value $U_1$ and controlling the actuating drive for closing the flap to the closed position, when $U_S < U_1$ Detecting the actuation of the switch, when the sensor signal value $U_S > U_3$, or when $U_4 < U_S < U_3$ — S5

Controlling the actuating drive when an actuation of the switch has been detected — S6

FLAP ACTUATOR

FIELD OF THE INVENTION

The invention relates to a flap actuator comprising a flap to be actuated by means of the flap actuator.

BACKGROUND OF THE INVENTION

Flap actuators are used in the automotive industry, amongst others, for actuating various types of flaps, for example, for actuating charging flaps or fuel flaps.

Actuators operated by electric motors are used, for example, as actuating drives for actuating the flap. They can be coupled directly or via a transmission, with various types of flaps. In automotive applications, this can be, for example, a flap of an air conditioning circuit, a fuel or a charging flap.

Such flaps are often subject to the application of external forces, such as vibrations and air currents, so that there is a risk for the flap to be inadvertently actuated. In particular, it must be ensured that the flaps remain in their closed position. This can be actively achieved by means of an electric motor of the actuating drive, which leads, however, to constant loading of the material and an increased energy consumption.

Furthermore, it is often necessary to safely detect when the flap has reached an end position. In particular, it may also be necessary to monitor whether the flap remains in its closed position.

Thus there is often the problem to ensure that a flap has reached its closed position and remains in this closed position until the actuating drive receives a control signal for opening the flap even when the actuating drive is not actively controlled for retaining the flap. The sensors necessary for monitoring the closed position should require as little structural space as possible and provide a precise sensor signal over the entire service life.

OVERVIEW

It is thus an object of the invention to provide a flap actuator having a low energy consumption, which exerts a restoring force or retaining force on the flap so that it is retained in the closed position.

The object is achieved according to the invention by a flap actuator consistent with the present disclosure.

A flap actuator is provided, comprising a flap, an actuating drive for actuating the flap along an actuating path from a closed position to an open position, and having a linkage mechanism. The linkage mechanism comprises a toggle joint comprising a first leg and a second leg, wherein the first leg is rotatably supported at a first rotation point, the second leg is rotatably supported via a second rotation point, and the first leg and the second leg are rotatably connected to each other at a third rotation point. Herein, the second leg includes a guiding slot along a longitudinal direction of the second leg. Furthermore, the first leg includes a guiding projection engaging the guiding slot, wherein the guiding projection is supported in the guiding slot to be movable along the longitudinal direction. The toggle joint further comprises an elastic element, which exerts a force on the toggle joint when the flap is in its closed position so that the toggle joint causes a restoring force on the flap in the closing direction. Alternatively or additionally, it is provided that the guiding slot has a length L and a width Br, with L>Br, and wherein the projection is in at least partial engagement with the first recess when the flap is in its closed position.

The toggle joint can thus cause a retaining force and/or a restoring force on the flap in the closing direction. In particular, a continuous retaining and/or restoring force can thus be applied to the flap so that the latter is retained in the closed position and inadvertent opening of the flap due to vibrations or other external influences is prevented, for example.

Preferably, the actuating drive comprises an electric motor, for example an electronically commutated electric motor. In particular, the actuating drive can comprise at least one brushless DC motor and at least one stepper motor.

An output of the electric motor can be mechanically coupled to the flap and an actuating position of the flap can be changeable by means of the actuating drive. The electric motor can also be part of an actuating drive, wherein the actuating drive can further comprise a transmission, in particular a reduction transmission. For example, a speed reduction can be implemented in the range from 100:1 to 1000:1 by means of one or more transmission stages. A correspondingly large torque can thus be transmitted to the flap which is, for example, in the range from 0.1 Nm to 10 Nm, in particular in the range from 0.2 Nm to 4 Nm.

The actuating drive can be adapted and formed to actuate the flap along an actuating path from an open position to a closed position and vice versa. Preferably, the second leg, at a position $Pos_2$ along the longitudinal direction of the guiding slot, at which the projection is situated when the flap is open, includes a second recess having a width $Br_2$, with $Br_2>B$. In this embodiment, the guiding projection is in at least partial engagement with the second recess when the flap is open. Herein, the projection interacts with the second recess in such a manner that a retaining force is caused and the flap is thus locked. For closing the flap, the retaining force can be overcome by the actuating drive and the flap can be actuated to the closed position. The retaining force can be in the range, for example, of 0.1 N to 20 N, in particular in the range from 0.2 N to 1 N.

In some embodiments, the elastic element can be arranged at the guiding slot of the second leg, and can exert a force on the toggle joint when the flap is in its closed position thereby causing a restoring force on the flap in the closing direction. In particular, the elastic element can bear against the guiding projection of the first leg to transmit the force when the flap is in its closed position.

In some embodiments the elastic element comprises a torsion spring. This can be arranged, in particular, at the second rotation point, and cause a force on the second leg so that the toggle joint provides a restoring force in the closing direction when the flap is in its closed position. Alternatively, it can be provided that the torsion spring is arranged at the first rotation point.

The actuating path can further comprise a first region $B_1$ and a second region $B_2$, wherein the first region $B_1$ extends from an open position $P_O$ to a first position $P_1$, which is between the open position $P_O$ and a closed position $P_S$ of the flap, and wherein the second region $B_2$ extends from a first position $P_1$ to a closed position $P_S$ of the flap. Preferably, the elastic element exerts a restoring force on the flap when the flap position is in the second region $B_2$ of the actuating path. For example, the elastic element can be arranged in such a manner that the latter is elastically deformed during actuation along the second region $B_2$ of the actuating path. Furthermore, the guiding projection of the first leg can come into contact with the elastic element during the actuation process from the open position $P_O$ to the closed position $P_S$ only when the first position $P_1$ is reached. During the further closing operation along the second region, the elastic element can be continuously elastically deformed so that a restoring force is built up. The elastic element can thus be relaxed when the flap is in the open position and/or stressed during the actuating movement to the closed position $P_S$.

Preferably, the elastic element is arranged at the toggle joint in such a way that a maximum elastic deformation of the elastic element occurs at a second position $P_2$ along the actuating path situated in the second region, wherein the second position $P_2$ is situated before the closed position $P_S$. The spring force of the elastic element is thus increased when the flap is opened starting from the closed position $P_S$ until it reaches the second position $P_2$. The second position $P_2$ can correspond, in particular, to a parallel alignment of the legs of the toggle joint.

Thus, excellent protection against inadvertent opening of the flap due to external influences can be achieved, in particular. After the second position has been reached, the elastic element can further relax during further opening of the flap until the first position is reached and the elastic element is completely relaxed again. The maximum stress of the elastic element can thus be at the second position, with the elastic element in these embodiments being partially relaxed when the flap is completely closed. Along the second region of the actuating path, a restoring force can be transmitted to the flap in the closing direction via the toggle joint. The maximum restoring force acting on the flap, in these embodiments, can be applied when the flap position is in the region from the second position $P_2$ to the closed position $P_S$. In particular, the restoring force acting on the flap can be continuously increased from the first position $P_1$ in the closing direction.

For opening, the actuating drive now has to overcome the restoring force/spring force being applied by the elastic element. Herein, it can be provided that, starting from the closed position $P_S$ in the second region $B_2$ of the actuating path until the second position $P_2$ is reached, a constant or continuously increasing restoring force has to be overcome. During further opening, the spring force can further decrease between the second position $P_2$ and the first position $P_1$.

Furthermore, it can be provided in some variants, that the restoring force is reversed during opening at the second position $P_2$ so that it counters the actuating movement between the second position $P_2$ and the closed position $P_S$ and acts in the direction of the actuating movement towards the open position between the second position $P_2$ and the first position $P_1$.

In the first region $B_1$ of the actuating path, the spring force can be advantageously removed, for example by the elastic element being completely relaxed or by mechanically decoupling the spring force from the mechanics of the toggle joint.

The spring force of the elastic element can be chosen such that manual opening of the flap is possible. For example, the elastic element can have a force $F_{el}$ in the amount of 2 N$\leq F_{el} \leq$100 N, in particular in the range from 5 N$\leq F_{el} \leq$50 N. A force $F_s$ acting on the flap in the closing direction via the toggle joint can be in the amount of 0.2 N$\leq F_s \leq$10 N, in particular in the range of 0.5 N$\leq F_s \leq$5 N. Additionally, the flap can exert a retaining force $F_H$ due to the blocking momentum of the electric motor and/or due to mechanical resistance, such as transmission friction or irreversibility of a transmission. The sum of the retaining force $F_H$ and the force $F_s$ caused by the elastic element counters a movement of the flap in the direction of the open position. The retaining force $F_H$ can, for example, be in the amount in the range of 0.3 N$\leq F_H \leq$10 N, in particular in the range of 0.3 N$\leq F_H \leq$2 N. The sum $F_{sum}$ of the forces to be overcome can be, for example, in the range of 0.4 N$\leq F_{sum} \leq$10 N, in particular in the range of 0.5 N$\leq F_{sum} \leq$5 N. A user can thus also manually open the flap, for example when there is a malfunction and/or the actuating drive is not being powered.

Furthermore it can be advantageous that the flap is actuatable in the closing direction in a third region $B_3$ beyond the closed position. In particular, it can be provided that the elastic element exerts a force on the toggle joint when the flap is in the third region $B_3$. A restoring force can thus be caused on the flap in the closing direction also in the third region $B_3$. In some embodiments, an elastic seal is arranged between the flap and the frame, wherein the seal is compressed when the flap is adjusted beyond the closed position $P_S$. Herein, a mechanical end stop can be reached when the seal is fully compressed so that a further actuating movement is not possible in the closing direction. The end stop can be provided, for example, by the frame of the flap.

Preferably, the flap actuator comprises a force sensor which is arranged at a frame supporting the flap and has a force applied to it by the flap when it is in the closed position $P_S$.

The force sensor can comprise, in particular, at least one strain gauge (DMS sensor) or at least one piezoelectric sensor, or at least one MEMS (micro-electro-mechanical system) sensor. The force sensor can be formed, for example, as a cantilever beam. Strain gauges change their electric resistance with minimal deformation. The strain gauge can be formed, for example, as a foil, semiconductor or as a multiple strain gauge. The embodiments can always vary herein. For example, the strain gauge can be formed as a transverse-direction strain gauge, as a full-bridge strain gauge or as a rosette strain gauge.

In some further embodiments of the flap actuator, the force sensor, for example at least one DMS sensor, is arranged on a spring element and fixedly connected to the latter. In particular, it can be provided that, in its closed position, the flap contacts the spring element of the force sensor. Herein, a force applied by the flap on the spring element is transferred to the force sensor. The force measurement thus achieved can be extremely precise.

For example, the spring element of the force sensor comprises at least one leaf spring or a cantilever beam. The term leaf spring, in the context of the present invention, should be understood as widely defined and can comprise, in particular, various elastically deformable metallic bending elements, such as spring sheets. The force sensor can then be fixed on the leaf spring or on the cantilever beam, for example, by adhesively gluing the force sensor. In particular, the spring element can be formed and arranged in such a manner that mechanical deformation, for example bending, can only occur in one direction. The leaf spring or the cantilever beam can be connected to the frame of the flap actuator in a first region and can be freely movable in a second region. Force transmission can then advantageously occur at the freely movable region, in particular only in one spatial direction. When it is formed as a leaf spring, the maximum bending of the leaf spring can be, for example, in the region from 0.1 mm to 10 mm, in particular in the range from 0.2 mm to 2 mm.

In some embodiments, each of the strain gauge(s) can comprise a resistor bridge circuit having two bridge legs. In some embodiments, the force sensor assembly can also comprise a combination of various strain gauges. The DMS sensor can also comprise an operational amplifier, wherein a first input of the operational amplifier is connected to a first bridge leg and a second input of the operational amplifier is connected to a second bridge leg. An output of the operational amplifier, or a logic circuit connected to the output of the operational amplifier, can provide the sensor signal output. In some further embodiments, the first bridge leg or the second bridge leg is electrically connected to a digital-analog converter or a pulse width modulation via an electric resistor. The resistor can comprise one or more ohmic resistors and can have an ohmic resistance in the range from 1 kΩ to 100 kΩ. In some embodiments, the high-value resistor can be formed by a protective resistor. The resistor is preferably configured such that it has higher ohmic resistance than the individual bridge resistors, in particular has higher ohmic resistance than the bridge resistor of the bridge circuit. By combining a plurality of resistors in a series and/or parallel circuit, tolerances can be compensated or values can be optimally adapted to the measuring task. Alternatively, a special digital-analog converter can also be used with a current output. This can also be alternatively connected to the bridge circuit without the aid of a resistor. Such approaches are technically equivalent and are not further discussed here for the sake of simplicity.

The DMS sensor can also be operated in a clocked manner to reduce power losses. For example, the detection of a force can be carried out at intervals. Alternatively or additionally, a force measurement or a sequence of force measurements can be triggered by a wake-up signal.

The DMS sensor can be formed such that the signal swing for the forces to be expected is in the range of 0.2 mV/V to 20 mV/V, in particular in the range of 1 mV/V to 6 mV/V. The differential output voltage of the DMS sensor can be, for example, in the range of 1 μV to 500 μV, in particular in the range of 5 μV to 100 μV. For example, a DMS sensor can be digitally converted with a resolution of 10 to 12 bits or more. With the arrangement of the DMS sensor on a leaf spring or another elastically bendable cantilever beam and maximum bending of the leaf spring in the range from 0.5 mm to 2 mm, for example, a resolution of smaller than $10^{-3}$ mm/LSB can be provided in relation to the value of the bit LSB.

In some embodiments, the force sensor is arranged on a frame of the flap. Preferably the flap then comprises a projection arranged on an inside of the flap and in contact with the force sensor when the flap is in the closed position $P_S$. The projection can thus interact with the force sensor when the flap reaches the closed position. In particular, it can be detected whether the flap is in the closed position. For this purpose, a sensor signal $U_S$ of the force sensor can be evaluated continuously or at intervals, and it can be checked whether the flap is in the closed position. For example, it can be detected that the flap is in the closed position when the sensor signal reaches or exceeds a first sensor threshold value $VS_1$. Preferably the closed position is detected when the sensor signal is between the first threshold value $U_1$ and a second threshold value $U_2$, with $U_2 > U_1$.

In such embodiments, in which a further movement of the flap is possible in the closing direction starting from the closed position $P_S$, an external force acting on the flap can cause an increase of the force acting on the force sensor. The force sensor is thus preferably configured in such a manner that the application of an external force on the flap or on a component supported by the flap is detected when the flap is in its closed position. The flap actuator can thus be used as a switch, wherein the switch is actuated by a pressure exerted by a user. For example, in the case of a flap that is rotatably supported on one side, actuation of the flap beyond the closed position is possible in the range from 0.1° to 5°. Irrespective of the design of the flap, it can be provided that the flap or a portion of the flap can be adjusted by the external force by 2 mm to 2 cm beyond the closed position. By moving the flap, the above-mentioned projection or another component of the flap can then be pressed against the force sensor and the corresponding sensor signal can be detected by the control circuit. For example, during movement in the closing direction, in the third region of the actuating path, further deformation of the strain gauge can occur. A change in the switching state can thus be derived from the change in the sensor signal.

In particular, the flap can be formed as the key of a pressure switch, so that the pressure exerted on the flap is detected by the pressure sensor when the flap is in its closed position. For example, actuating the pressure switch can lead to detection, when the sensor signal has reached or exceeds a third threshold value $U_3$. Actuation can be detected, for example, when the sensor signal is between the third threshold value $U_3$ and a fourth threshold value $U_4$, with $U_4 > U_3$. Preferably, the third threshold value is larger than the first and/or the second threshold values. In particular, $U_1 < U_2 < U_3 < U_4$ can apply.

The electric motor can thus be controlled and/or feedback controlled as a function of the force detected by the force sensor. For example, the electric motor is an electronically commutated electric motor or a DC motor.

The flap actuator can further comprise a force sensor arranged at the flap or the frame, and a control circuit coupled to the force sensor for the exchange of sensor data. The control circuit can be adapted, in particular, to detect, by means of the force sensor, an external force exerted on the closed flap. For this purpose, the control circuit can be formed and adapted to receive and evaluate the sensor data. In particular, the control circuit can be adapted to detect whether the flap is in the closed position. According to a further aspect, the control circuit can be adapted to detect actuation of the switch on the basis of the sensor data of the force sensor. The control circuit can also be adapted, in particular, to change a switching state of the switch as a function of the detected force.

Furthermore, the control circuit can be adapted to control the electric motor of the actuation drive. In some embodiments of the flap actuator, the control circuit can be adapted to control the flap actuator for opening the flap when the application of an external force on the flap or on a component supported by the flap is detected when the flap is in its closed position.

In some embodiments, the control circuit comprises a microcontroller (μC) or an Application-Specific Integrated Circuit (ASIC). The control circuit can also comprise, in particular, at least one motor driver, for example an H bridge, a B6 bridge or any number of bridge legs. Furthermore, the control circuit can be adapted to control and/or to feedback control the electric motor by means of pulse width modulation. In some embodiments, a plurality of motor drivers can also be provided. For example, an electric motor can be controllable by the control circuit as an actuator for actuating the flap, and a second electric motor can be controllable for actuating a locking apparatus.

The control circuit can also comprise a signal input for receiving the sensor signal. For example, the signal input can be an I/O input of the microcontroller of the control circuit or an input of a digital-analog converter of the control circuit. Herein, the force sensor can be coupled to the control circuit via a printed circuit board and/or via a wire connection for providing the sensor signal. Furthermore, it can be provided that the force sensor is supplied with energy via the control circuit. For this purpose, the force sensor can be connected to a ground connection provided by the control circuit and a supply voltage. In some embodiments, it can also be provided that the force sensor is coupled to the control circuit for the transmission of the sensor signal to the latter in a wireless manner. In such embodiments, a separate energy supply of the force sensor can be provided.

The flap can also comprise a locking apparatus, wherein the locking apparatus locks the flap in such a manner that a force is applied to the force sensor also in the locked state. For example, during the closing operation, a projection of the flap can interact with a counter piece arranged on the frame of the flap so that the flap is locked. In some further embodiments of the locking apparatus, it can be provided that the projection is formed to be movable and is moved by means of the actuation drive, so that the locking apparatus is activated when the flap is closed and the locking apparatus is unlocked when the flap is opened. The projection for locking the flap and the projection which exerts a force on the force sensor when the flap is in its closed position can be one and the same projection.

In some embodiments, the flap is formed as a fuel flap or as a charging flap of an automotive vehicle. The flap can also be part of an industrial application, for example of an industrial robot. The external component can be, for example, part of a body of an automotive vehicle or a housing of an industrial robot. In particular, the external component can be connected to a frame of the flap and be arranged thereon so that the application of a force is transmitted to the frame via the flap and ultimately to the force sensor.

SHORT DESCRIPTION OF THE DRAWINGS

The invention will be explained in more detail in the following in relation to exemplary embodiments with reference to the accompanying drawings. In the drawings, in schematic views.

8

Figure 8A:
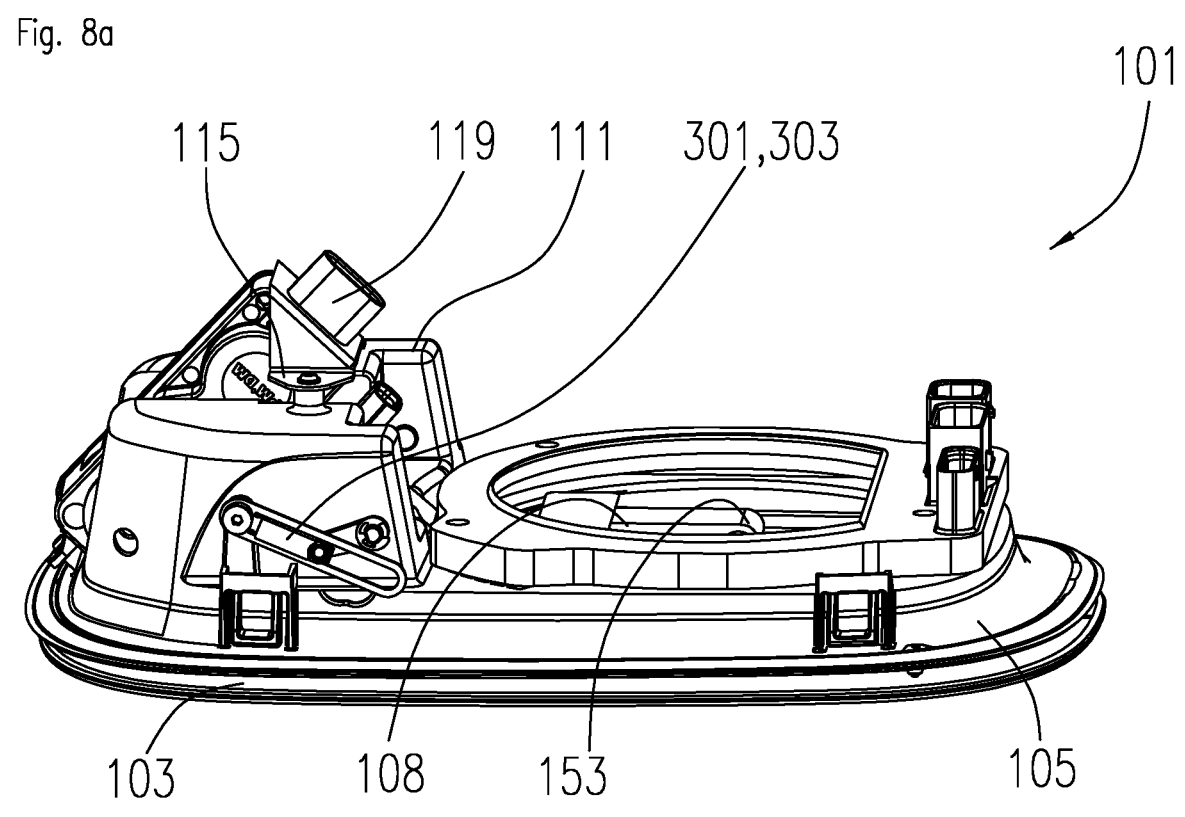
FIG. 8a shows a perspective view of the flap actuator comprising an alternative embodiment of the elastic element as a compression spring.
Figure 8B:
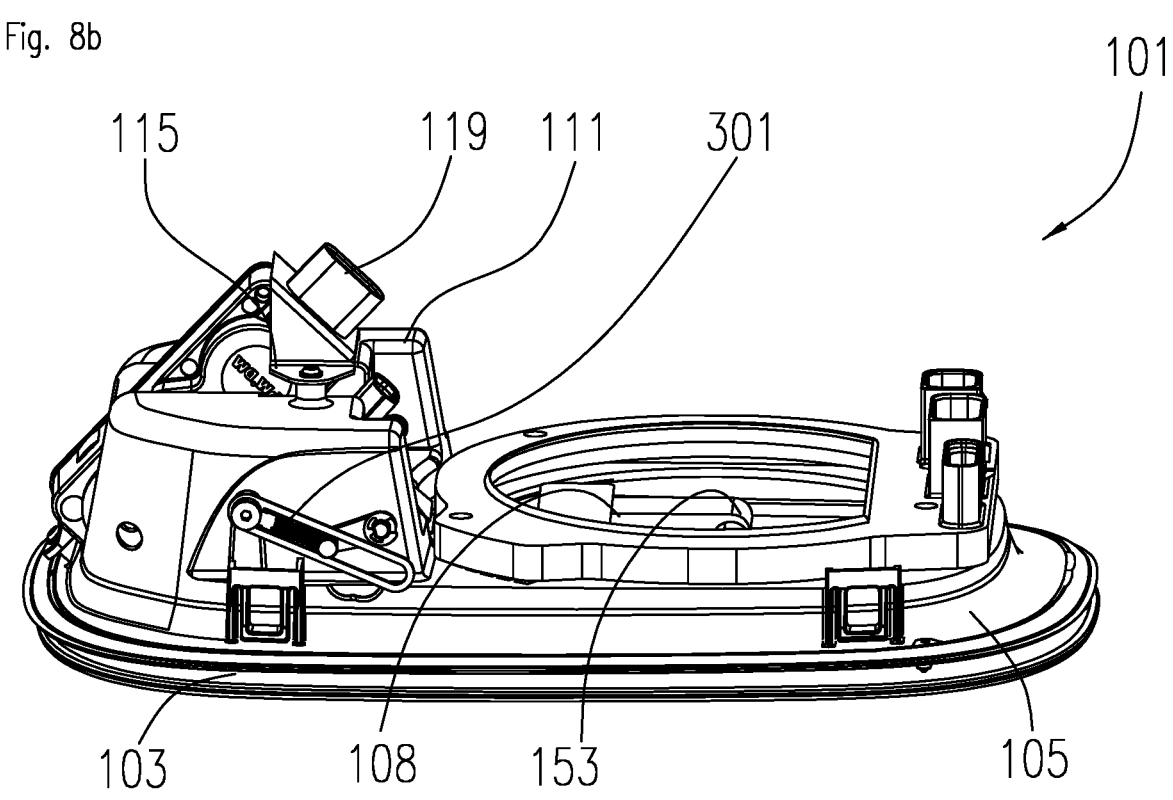
Figures 9A, 9B, 9C, 9D, 9E, 10:
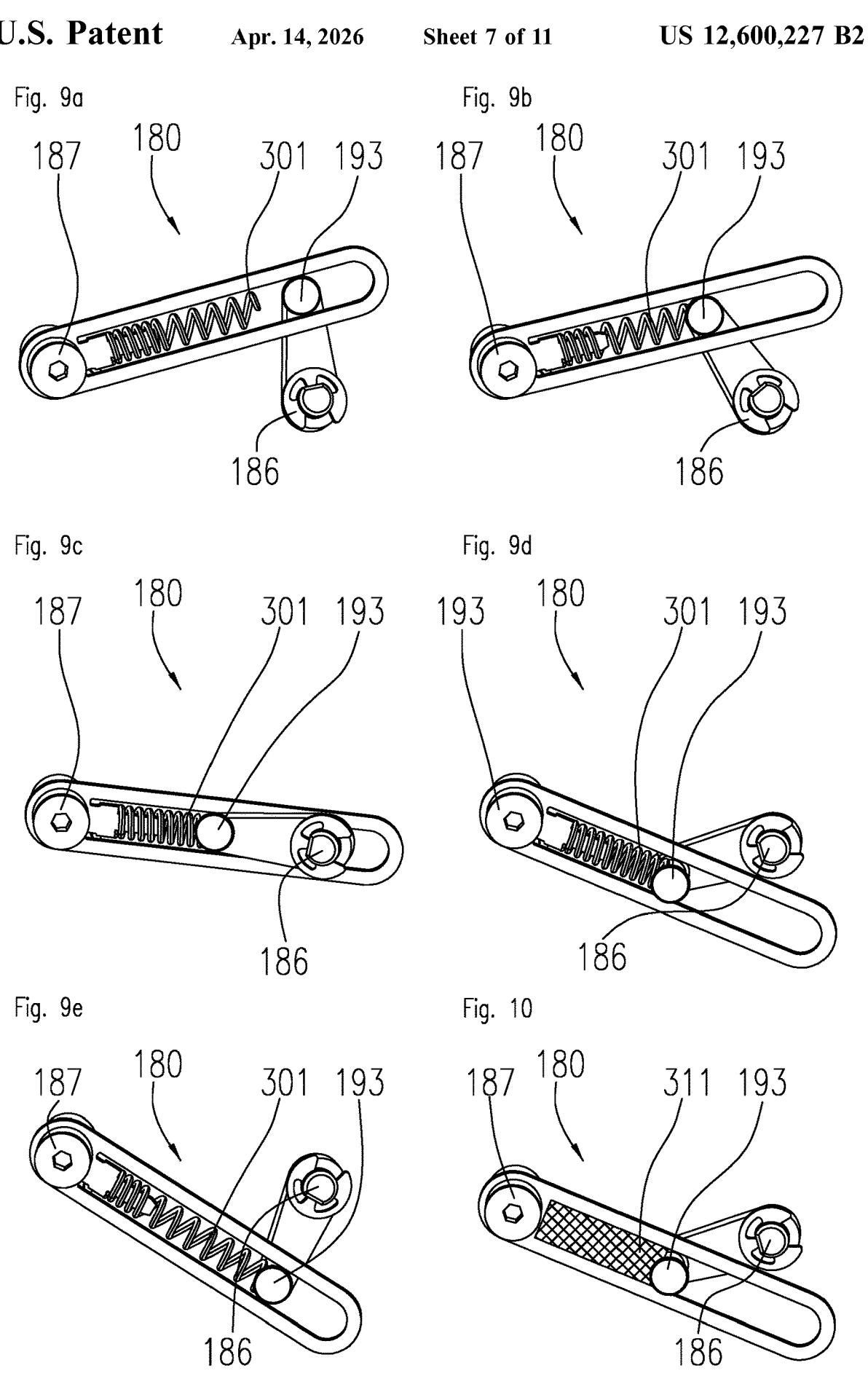
Figure 11A:
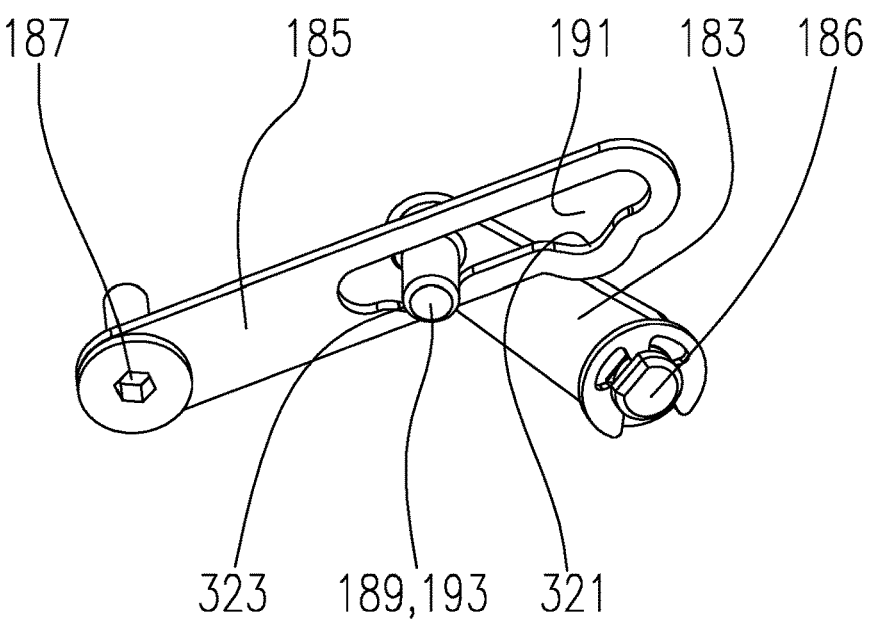
Figure 11B:
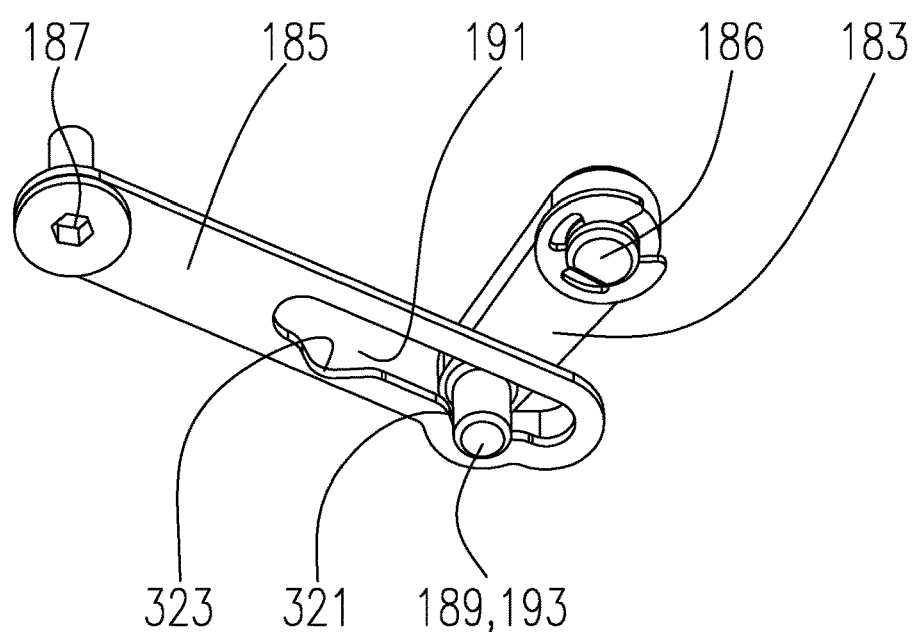
Figure 11C:
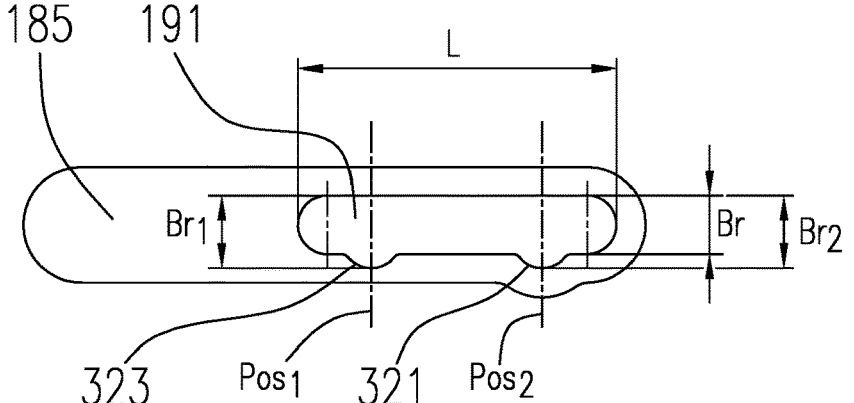
Figures 12, 13:
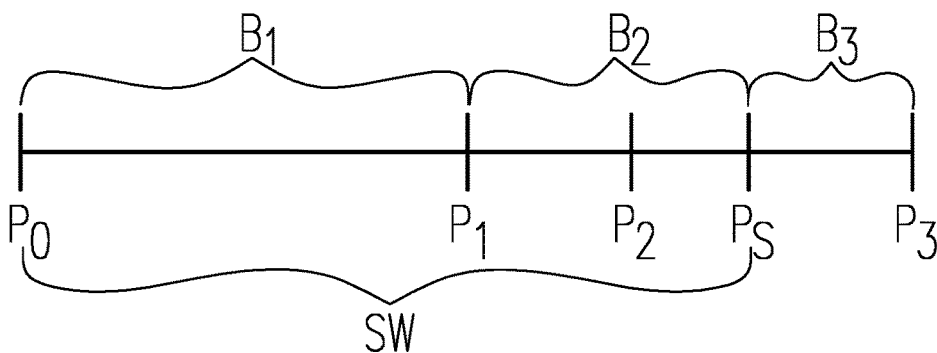
Figure 14:
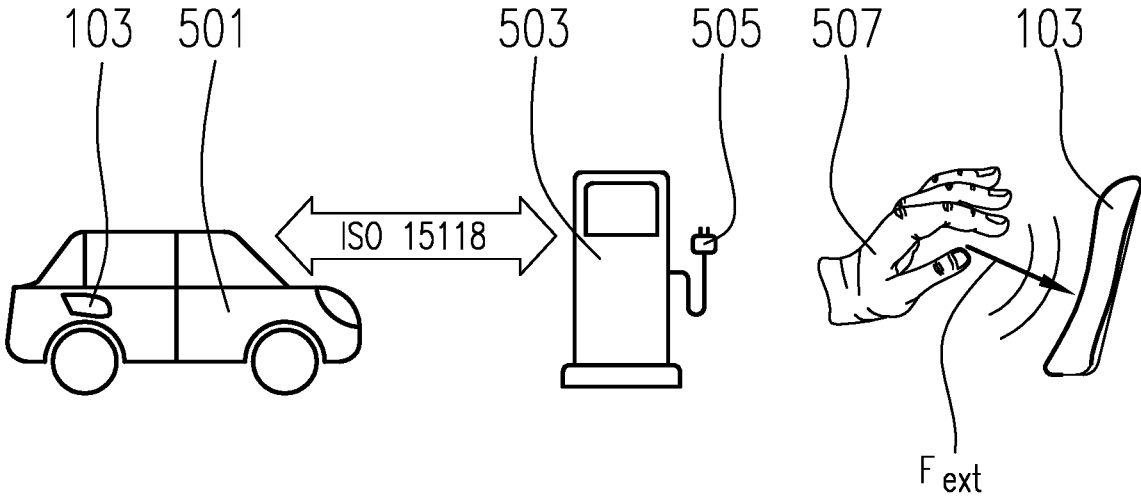
Figure 15:
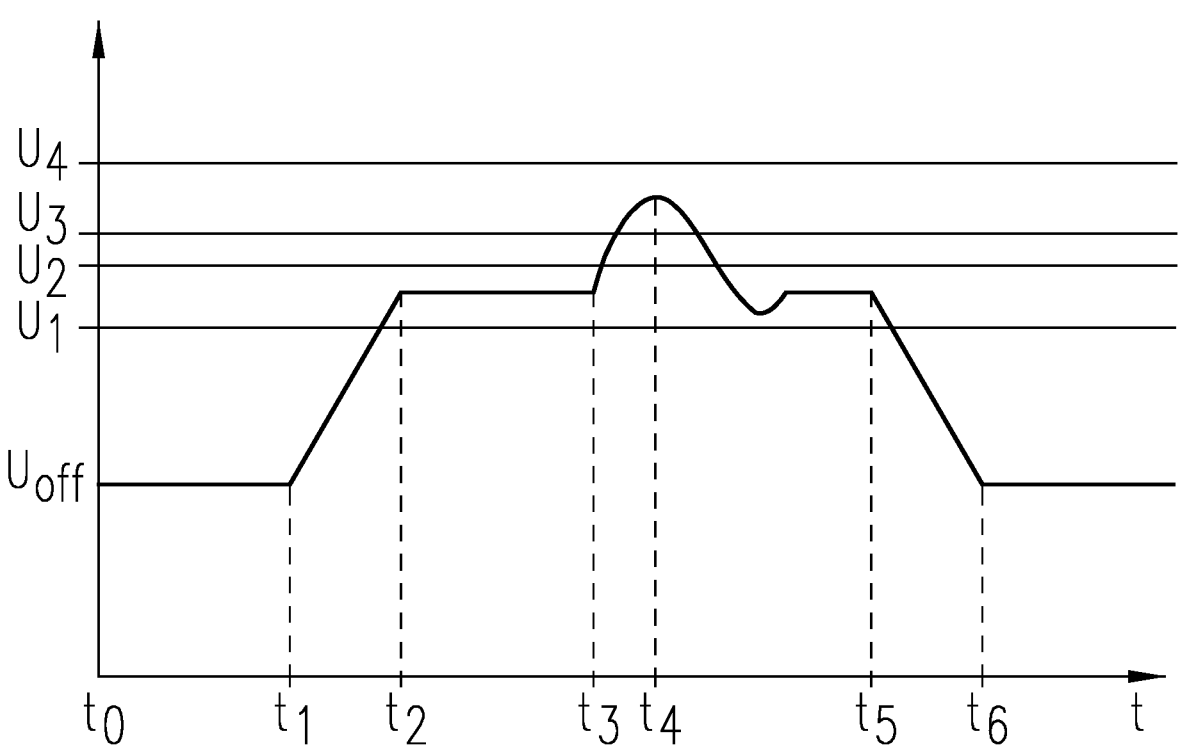

FIG. 8b shows a perspective view of the flap actuator comprising an alternative embodiment of the elastic element as a compression spring, wherein a cover of the compression spring has been omitted;

FIGS. 9a to 9e show an exemplary embodiment of the elastic element as a compression spring for various positions of the flap;

FIG. 10 shows an exemplary embodiment of the elastic element as an elastomeric element;

FIGS. 11a and 11b show an exemplary embodiment of the toggle joint with two recesses, shown in a position of the toggle joint when the flap is open (FIG. 11a) and when the flap is in its closed position (FIG. 11b);

FIG. 11c shows the second leg of the toggle joint of FIGS. 11a and 11b with dimensions indicated;

FIG. 12 shows a schematic view of the actuating path of the flap;

FIG. 13 shows a schematic view of the electronic circuit of a force sensor formed as a DMS sensor suitable for use in a flap actuator of FIGS. 1 to 8b;

FIG. 14 shows a schematic view of an exemplary application of the flap for a charging flap of an automotive vehicle;

FIG. 15 shows an exemplary behavior of a sensor signal voltage of the force sensor for a flap actuator of FIGS. 1 to 8 as a function of time; and FIG. 16 shows a flowchart of an exemplary method for operating the flap actuator.

DESCRIPTION OF THE DRAWING FIGURES

Figure 1A:
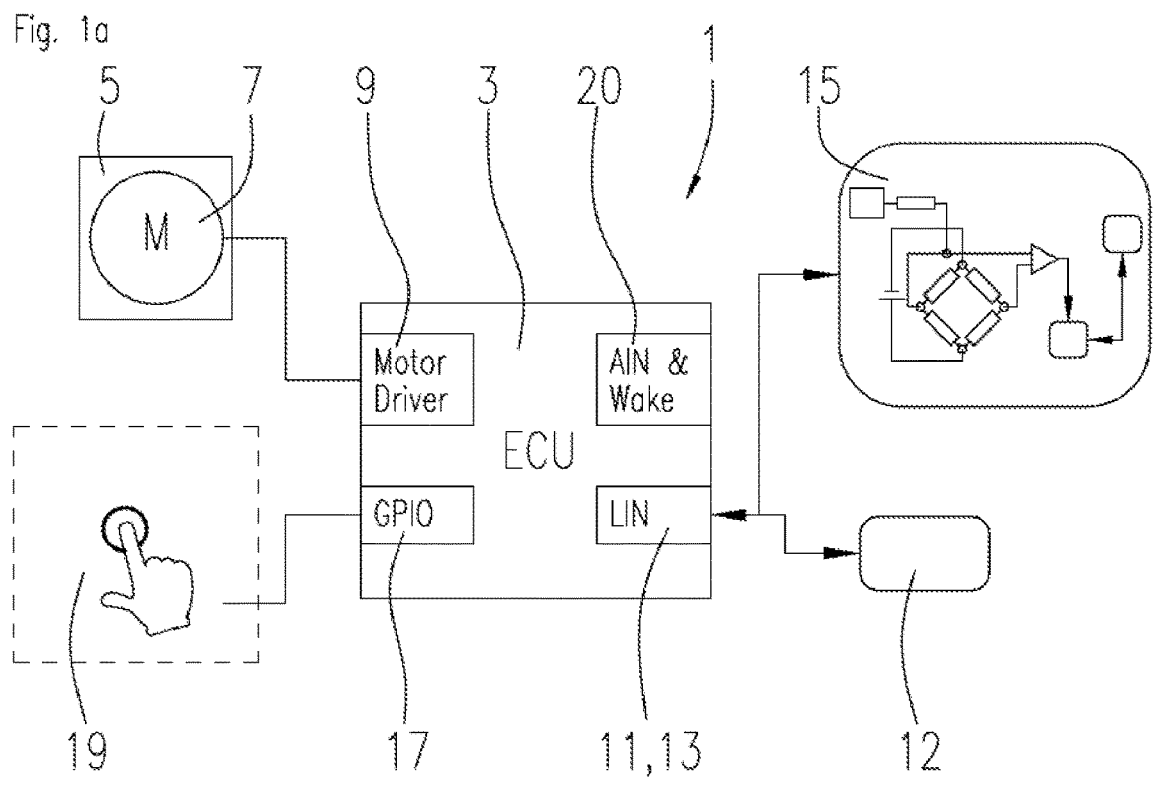
FIG. 1a shows a schematic view of an exemplary embodiment of a flap actuator according to the invention comprising a control circuit.
Figure 1B:
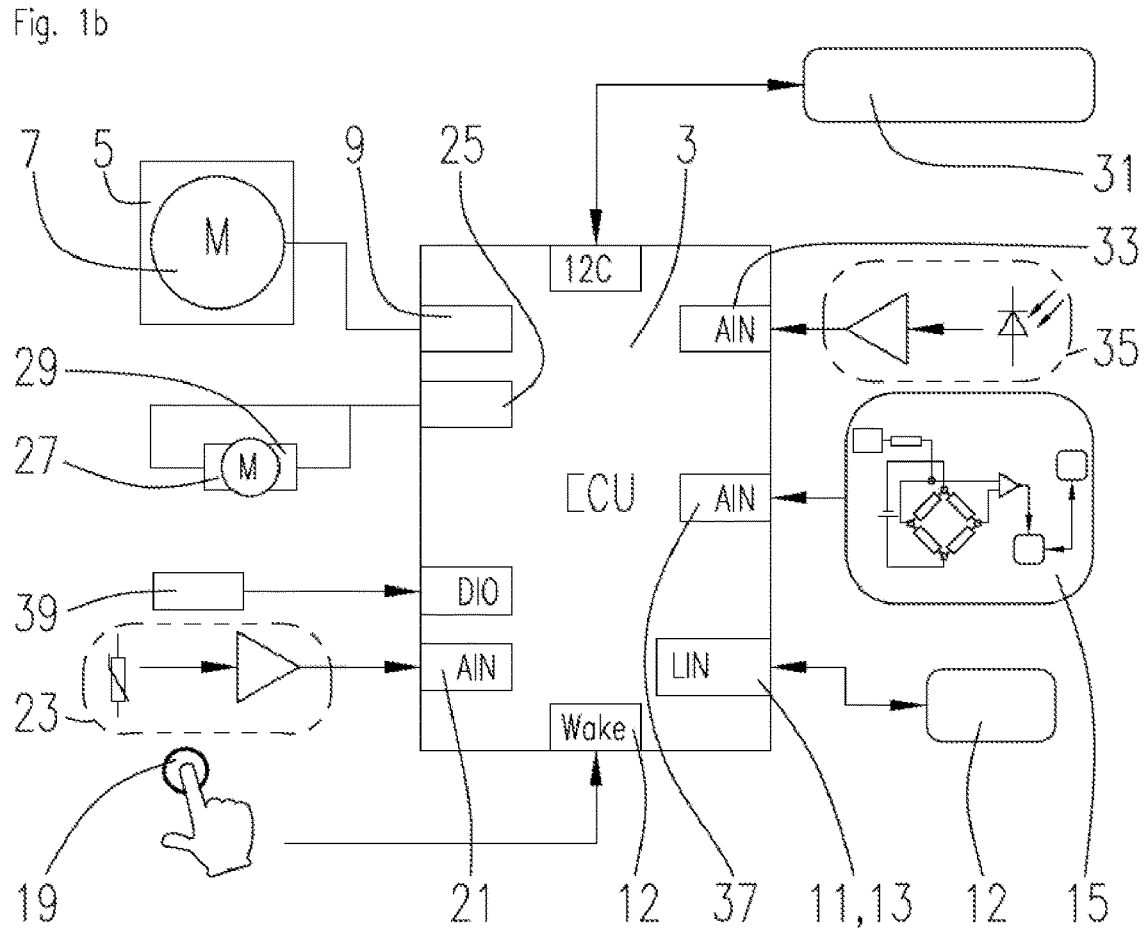
FIG. 1b shows a schematic view of a further exemplary embodiment of a flap actuator according to the invention comprising a control circuit.

FIG. 1a and FIG. 1b each show an exemplary embodiment of a flap actuator 1, comprising a control circuit 3, in a schematic view. In both variants, a control circuit 3 is provided, which is connected to an electromotive actuating drive 5 comprising an electric motor 7. The electric motor can further comprise an optional transmission, such as a reduction transmission. The control circuit 3 is formed, for example, as a microcontroller and comprises a motor driver 9 which is connected to the electric motor 7 via an output to control the same. The motor driver 9 can comprise, in particular, one or more H bridges, for example a B6 bridge circuit having six semiconductor switches.

Furthermore, a bus interface 11 is provided to connect the control circuit to a data bus 12, for example an LIN bus or a CAN bus. The bus interface 11, in the example of FIG. 1a, serves as a sensor signal input 13. A force sensor 15 formed, for example, as a DMS sensor is coupled to the control circuit 3 via the sensor signal input 13. The control circuit 3 also includes a GPIO (general-purpose in/out) interface 17 via which, in the example shown, a switch 19 is connected to the control circuit. The switch 19 can be used, in particular, to activate or trigger a control function of the electric device 4. Furthermore, the control circuit 3 includes a wake-up input 20. The wake-up input 20 can be used by the control circuit 3 to be woken from an energy-saving or sleep mode.

FIG. 1b shows a further exemplary embodiment of the flap actuator 1, comprising the control circuit and sensors, in a schematic view. In addition to the embodiment shown in FIG. 1a, the control circuit 3 includes further interfaces. The control circuit 3 thus comprises an analog input and output (AIN) 21 to which a temperature sensor 23 is connected, as an example. Furthermore, the control circuit 3 of FIG. 1b comprises a second motor driver 25 and a second electric device 27 which can be controlled and/or feedback controlled by the control circuit. In the example, the second electric device 27 is an actuator 29 comprising, for example, a second electric motor, a piezoelectric actuator or a solenoid and connected to an output of the second motor driver 29.

Additionally, the control circuit 3 of FIG. 1b comprises an LED assembly 31 and a second analog input 33. The second analog input 33 is coupled to a light sensor 35 in the example shown. For example, the light sensor 35 can be used for controlling or feedback controlling an illumination unit of the flap actuator 1, such as the LED assembly 31. The LED assembly can be configured, for example, for illuminating the flap. In this embodiment, the control circuit 3 further comprises a third analog input 37 which provides the sensor signal input 13 for the force sensor 15.

Figure 2:
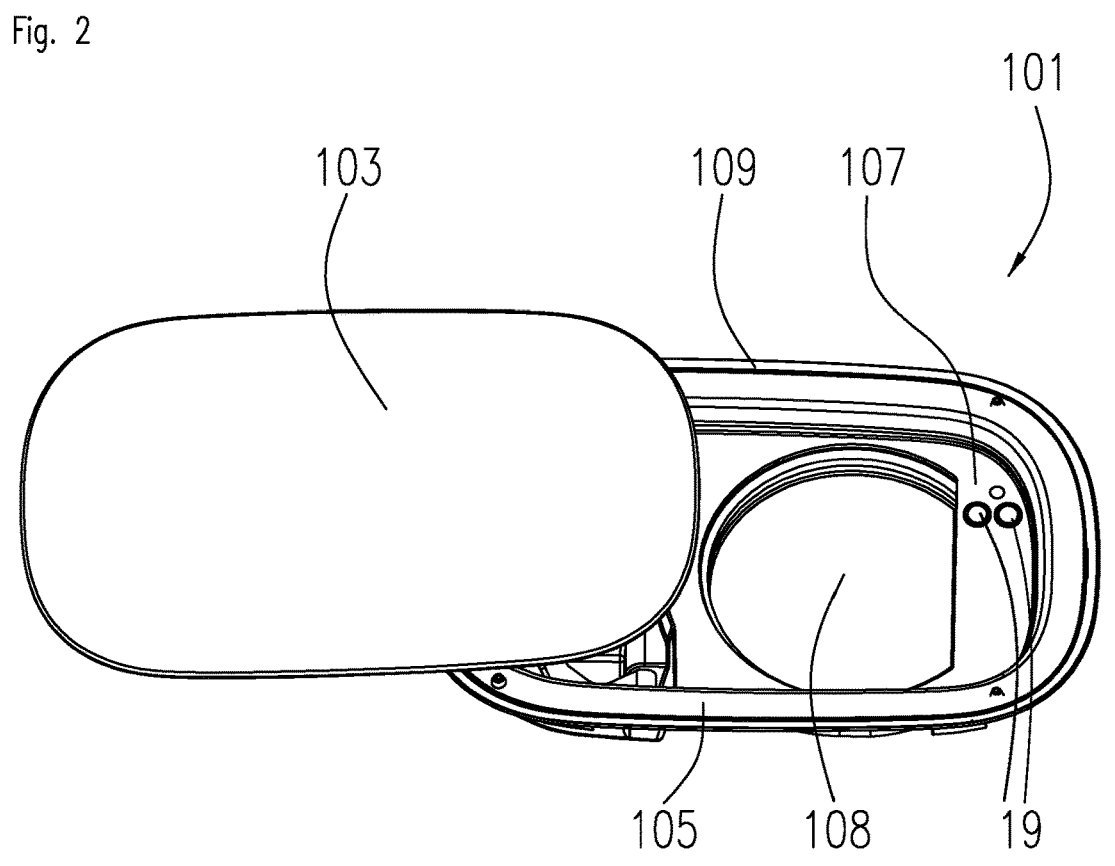
FIG. 2 shows a perspective view of an exemplary flap actuator comprising a flap for an automotive vehicle in the open state of the flap in a front view.

FIG. 2 shows a perspective view of an embodiment of the flap actuator 1 as a charging flap actuating system 101 for flap 103 of a charging socket, via which storage batteries of an electric vehicle can be charged. The flap actuator 1 here comprises a flap 103, which is attached to and supported by a frame 105 and, in the present example, is shown in the open state. In a back wall 107 of the frame 105, an opening 108 is provided, in which the charging socket can be arranged for receiving a charging connector. At the back side of the frame 105, a switch 19 is further arranged, which is able to be configured, for example, as a pressure switch, as a force sensor switch or as a capacitive switch. A seal 109 is further arranged on the frame 105 extending around its periphery, which ensures protection against the ingress of humidity when the flap 103 is in its closed position.

Figure 3A:
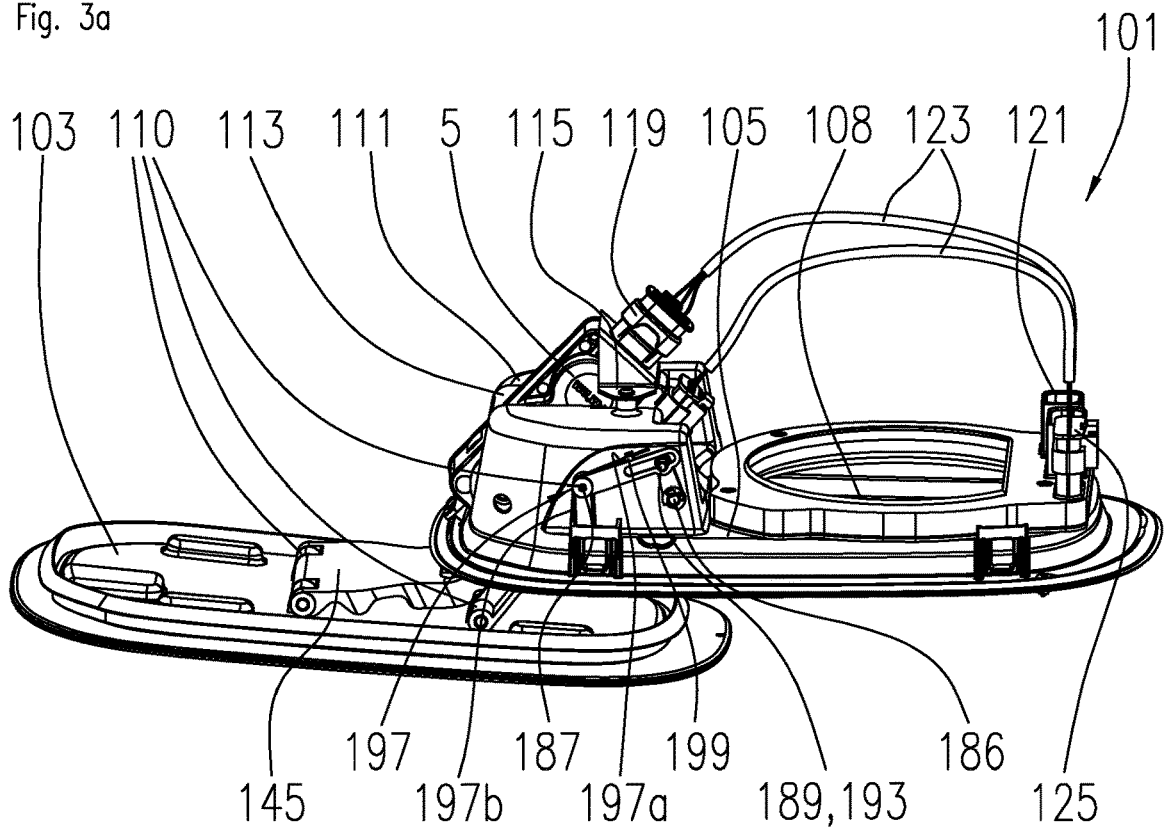
FIG. 3a shows a perspective view of the flap actuator of FIG. 2 in a back view, wherein the flap is fully open.

FIG. 3a shows further perspective views of the flap actuator 1 of FIG. 2, respectively showing a view of the inside of the flap 103 and the frame 105. The flap 103 is movably attached to the frame 105 by means of a linkage mechanism 110 and can be adjusted between the open position $P_O$ and the closed position $P_S$. FIG. 3a shows the flap 103 in the fully open position, while FIG. 3b shows a partially open position and FIG. 3c a fully closed position of the flap 103.

A base component 111 is shown at the frame 105 of the flap, which base component 111 supports the electric device formed as an actuating drive 5, the force sensor 15 and parts of the linkage mechanism 110. The actuating drive 5 is arranged in a recess 113 of the base component 111. Furthermore, a fixing part 115 is fixed on the base component 111, the fixing part 115 including a recess 117 through which a plug connector 119 of the actuating drive 5 is passed. The actuating drive 5 can thus be securely attached to the frame 105 of the flap 103. The plug connector 119 of the actuating drive 5 is connected to the connector 121 arranged on the frame 105 via a wire connection 123 to establish a connection to an external power supply and to receive signals. The connector 121 can be connected, in particular, to an LIN bus or a CAN bus of the automotive vehicle. The force sensor 15 is also connected to a connector 125 also arranged on the frame 105 via a wire connection 123. In the example shown, the sensor signal is fed to the control circuit 3 of the actuating drive 5 via an electric contact between the connectors 121 and 125.

Figures 3B, 3C:
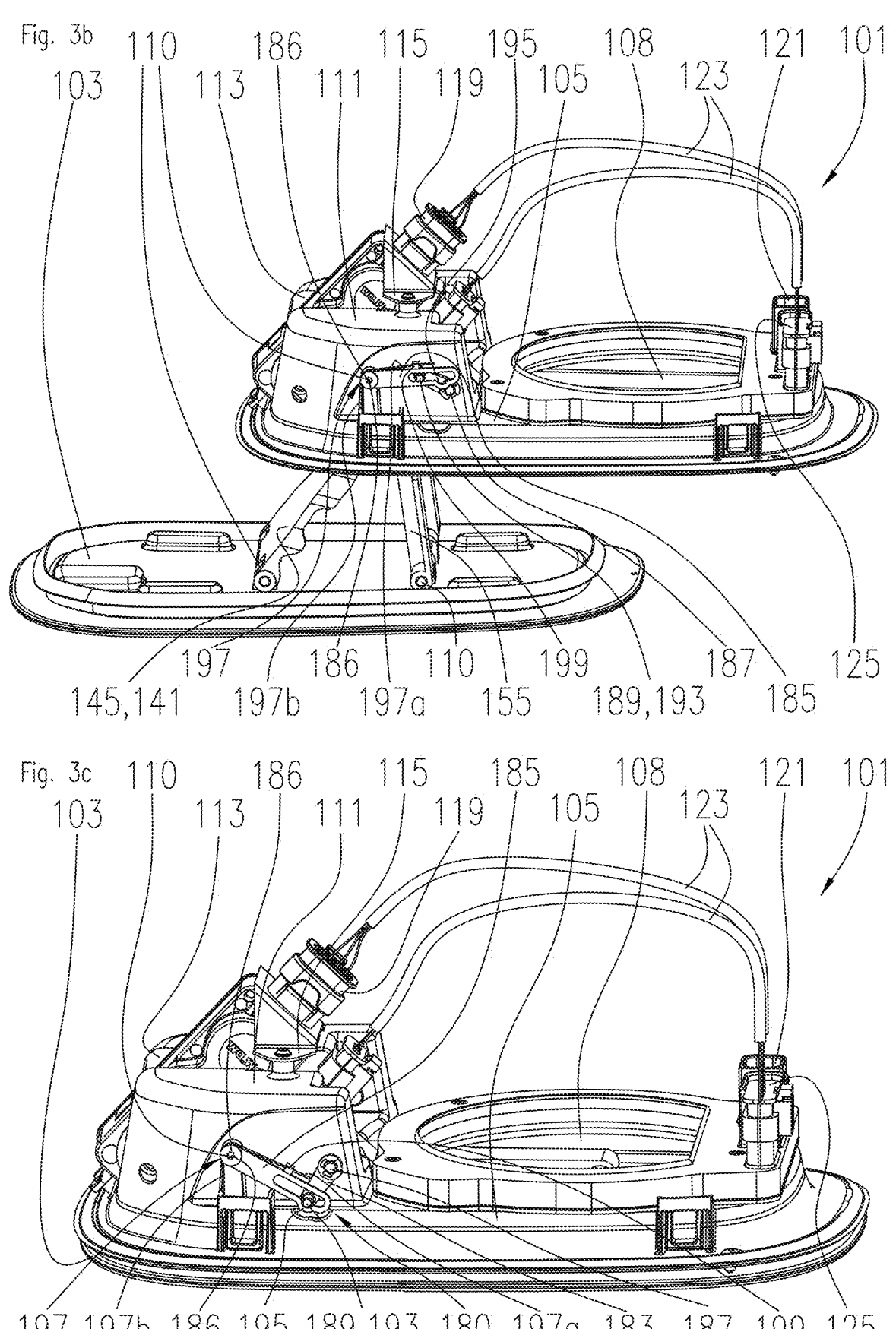
FIG. 3b shows a perspective view of the flap actuator of FIG. 3a, wherein the flap is partially open.
FIG. 3c shows a perspective view of the flap actuator of FIG. 3a, wherein the flap is fully closed.
Figures 4, 5:
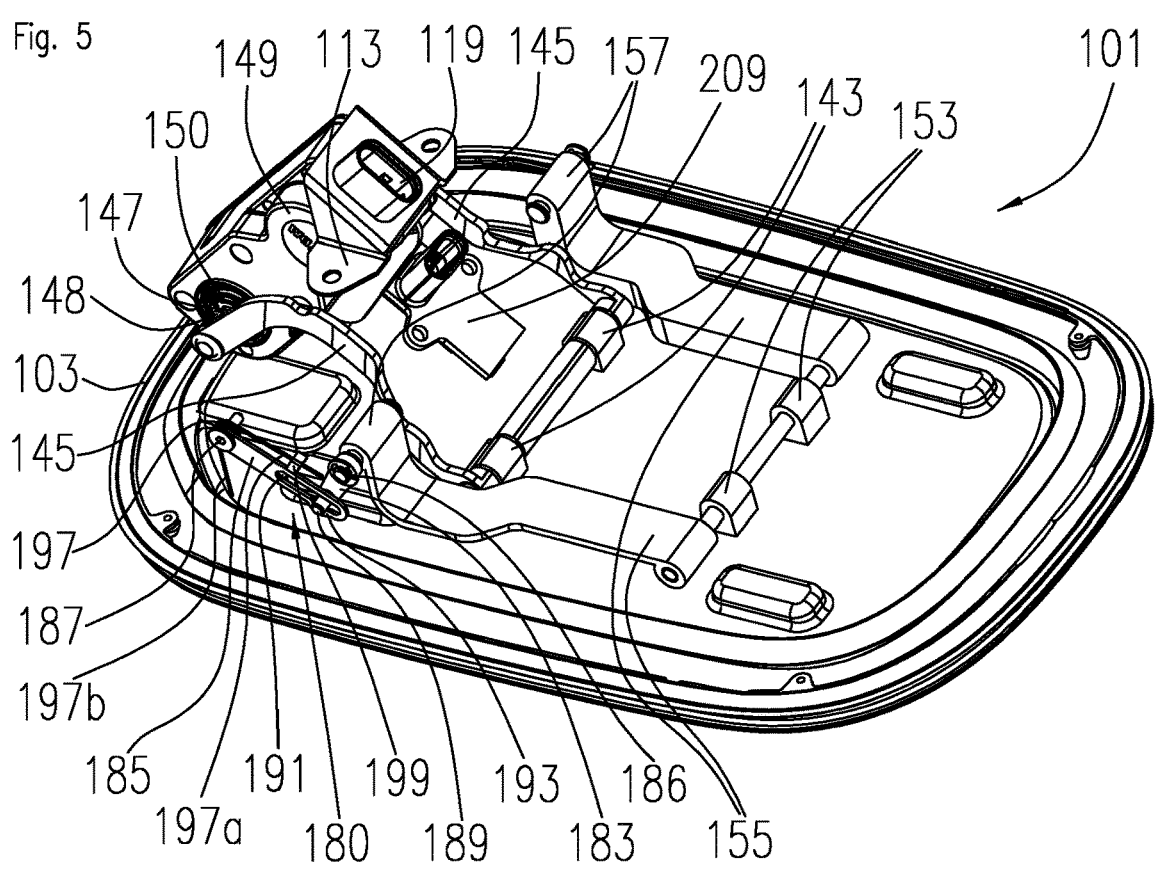
FIG. 4 shows a perspective view of the flap actuator corresponding to FIG. 3c, wherein a base component and further components have been omitted.
FIG. 5 shows a further perspective view of the flap actuator corresponding to FIG. 3c, wherein a base component and further components have been omitted.

FIG. 4 shows a view of the flap 103 in correspondence to FIG. 3c in the closed position $P_S$, wherein the base component 111 amongst others has been omitted to illustrate the linkage mechanism 110. The flap 103 is held via a trapezoidal linkage 141, wherein two rotary bearings 143 arranged on the inside of the flap 103 rotatably support an axle and wherein the axle is connected to a first pivot arm 145. The first pivot arm 145 is further coupled to an output of the actuating drive 5. In the example shown, the actuating drive 5 also has an output shaft 147 formed as a hollow shaft, which has a coupling 148 for transmitting a torque at both ends. A housing 149 of the actuating drive 5 thus has two opposite openings 150 via which the two couplings 148 of the output shaft 147 are respectively coupled to a coupling portion of the first pivot arm 145.

The trapezoidal linkage 141 further comprises two further rotary bearings 153 arranged on the inside of the flap 103 and rotatably supporting a second axle. The second axle is coupled with two curved pivot arms 155 arranged in parallel, wherein the two pivot arms 155 are respectively rotatably retained by means of a rotary bearing 157 on the base component 111. In principle, attaching the flap 103 on the base component 111 enables an opening and closing movement of the flap 103. In the example shown, the flap 103 is guided along a curved contour which executes lifting off of the flap 103 and simultaneous lateral distancing of the flap 103 from the frame 105.

Furthermore, the linkage mechanism 110 in the example shown comprises two toggle joints 180 arranged in parallel to each other, each comprising a first leg 183 and a second leg 185. The two first legs 183 are each rotatably supported at a first rotation point 186 on the base component 111 and each connected to one of the two curved pivot arms 155 in a torque-resistant manner. The two legs 185 are each also rotatably supported at a second rotation point 187 on the base component 111. Each of the two first legs 183 further comprises a guiding projection 189 engaging a guiding slot 191 of the respective second leg 185 and forming a movable third rotation point 193. The guiding slot 191, in the example shown, also comprises a respective recess 195 in which the guiding projection 189 comes to lie when the flap is in its closed position $P_S$ or in its open position $P_O$.

In the embodiment shown, at the toggle joints 180, an elastic element is also arranged formed as a torsion spring 197 in each case. The torsion spring 197, at its two ends, comprises a spring arm, wherein a first spring arm 197a bears against a projection 199 of the second leg 185 and a second spring arm 197b is fixed to a shape feature of the base component 111.

The arrangement and configuration of the torsion spring 197 is chosen such that it exerts a force on the flap 103 in its closing direction via the projection 199 of the second leg 185 and via the linkage mechanism 110. In particular, it can be provided that the spring force and/or the restoring force acting on the flap 103 continuously increases along the actuating path in the direction of the closed position $P_S$. The torsion spring 197, in the closed position $P_S$ shown, is stressed/compressed, and causes a force in the direction of the closed position $P_S$ so that the flap 103 is retained in this position and/or is returned to the closed position if it was partially opened by an external force.

FIGS. 4 and 5 show two perspective views of the inside of the closed flap 103, wherein the base component 111 has been omitted, amongst others. FIG. 4 shows, in particular, a projection 205 formed on the first pivot arm 145, which exerts a force on the force sensor 15 when the flap 103 is in its closed position. The force sensor 15 is formed here as a DMS sensor 207, wherein, in FIGS. 4 and 5, a cover 209 of the DMS sensor 207 is to be seen.

Figure 6:
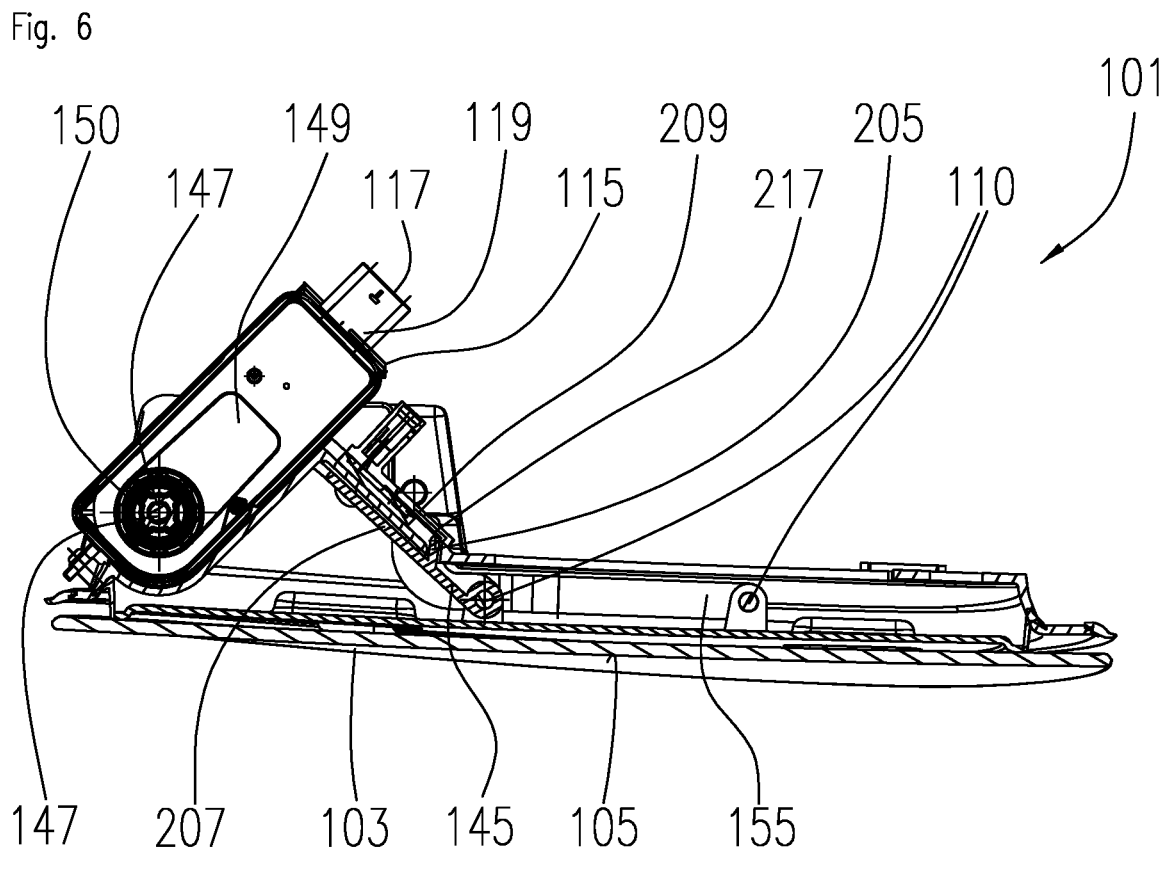
FIG. 6 shows a perspective view of the flap actuator corresponding to FIG. 2, wherein the flap is shown in the closed state.
Figure 7:
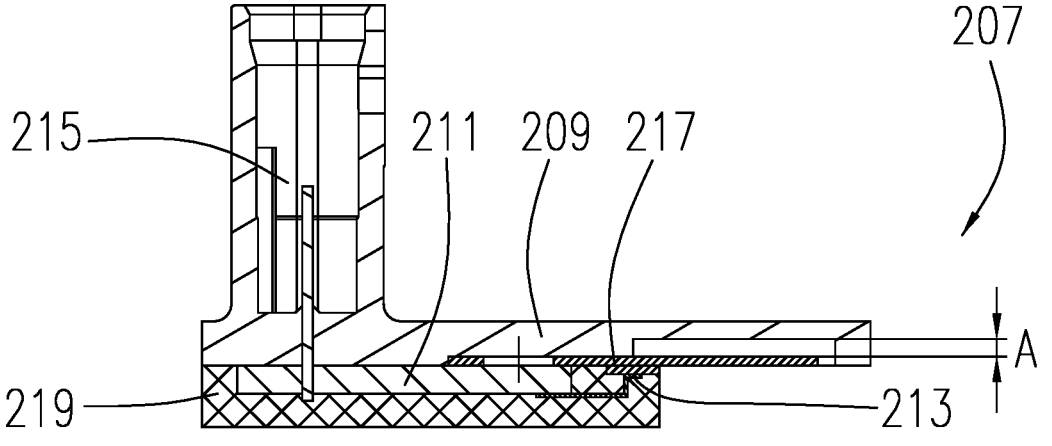
FIG. 7 shows a sectional view of the flap actuator with the flap closed, wherein the force sensor is visible.

In the sectional views of FIGS. 6 and 7, the DMS sensor 207 is shown, with FIG. 6 showing a sectional view of the charging flap actuating system 101 in correspondence to FIG. 3c and FIG. 7 only showing the DMS sensor 207. The DMS sensor 207 comprises, in particular, a sensor printed circuit board 211 on which the sensor circuit 213 is arranged which is contacted via a connector 215 and can be connected to the control circuit 3 of the actuating drive 5.

The sensor printed circuit board 211 is arranged on and attached to a leaf spring 217. Furthermore, the sensor printed circuit board 211 together with the electronic components arranged thereon is surrounded by a casting material 219, such as an epoxy resin. The sensor printed circuit board 211 and the electronic components arranged thereon can thus be protected against humidity. The assembly comprising the leaf spring 217 and the sensor printed circuit board 211 is arranged on an underside of the cover 209. The leaf spring 217 is rectangular, in the example shown, having a long side and a short side. One end of the long side is connected to the sensor printed circuit board 211, while the other end of the long side is free. The leaf spring 213 is arranged in such a manner that its free end has a distance A to the cover 209 in its force-free state, which can be, for example, in the range of 0.3 mm to 10 mm, in particular in the range of 0.5 mm to 5 mm. In the example shown, the cover 209 includes a recess at its underside so that a sufficiently large distance A of the free end of the leaf spring 217 to the cover 209 is provided. The leaf spring 217 can be touched by the flap 103 when the latter is closed so that a force is exerted on the leaf spring 217 and the leaf spring 217 is bent towards the cover 209. The DMS sensor 207 is thus also bent (strained). A change of the voltage level of the sensor signal will thus result at the signal output of the DMS sensor 207. The change in the sensor signal can thus be used to detect when the flap 103 has reached the closed position $P_S$ and/or an external force $F_{ext}$ is acting on the closed flap 103.

FIGS. 8a and 8b show an alternative embodiment of the flap actuator 1, wherein a compression spring 301 is used as the elastic element of the toggle joint 180. The compression spring 301 is arranged beneath a cover 303 on the second leg 185 of the toggle joint 180 (see FIG. 8a). The cover 303 is not shown in FIG. 8b so that the underlying compression spring 301 and its arrangement on the second leg 185 are clearly shown. An attachment projection is formed on one end of the guiding slot 191, on which projection one end of the pressure spring 301 is fixed. The other end of the compression spring 301 is contacted by the guiding projection 189 when the flap 103 is closed and the compression spring 301 thus compressed.

FIGS. 9a to 9e illustrate the interaction of the compression spring 301 with the guiding projection 189 during the closing movement in an exemplary embodiment. FIG. 9a shows an orientation of the toggle joint 180 for a fully open flap 103. As shown, the compression spring 301 can be formed and arranged such that the guiding projection 189 is freely movable in the guiding slot 191 when the flap 103 is situated in the first region $B_1$ of the actuating path. When position $P_1$ is reached, the guiding projection begins to compress the compression spring 301 (FIG. 9b). In the further course, the compression spring 301 can be further compressed during the closing process along the second region $B_2$ of the actuating path until maximum compression of the compression spring is reached at position $P_2$ (FIG. 9c). Maximum compression of the compression spring 301 corresponds to a parallel orientation of the two legs of the toggle joint 180. Until the closed position $P_S$ shown in FIG. 9d is reached, the compression spring 301 will be able to partially relax. A restoring force can thus be ensured, which retains the flap 103 in its closed position $P_S$. Furthermore, the force acting on the DMS sensor 207 can thus be continuously maintained, while the flap 103 is in the closed position $P_S$. In particular, as a result, monitoring of the closed position $P_S$ of the flap 103 by means of the DMS sensor 207 can also be carried out in this embodiment. If an external force now acts on the flap 103, it can be moved beyond the closed position $P_S$ in the closing direction, while the compression spring 301 is further relaxed, but still causes a restoring force in the closing direction. After the removal of the external force, the situation of FIG. 9d will be restored again, in which there is an equilibrium of the forces acting in the closing direction and against the closing direction.

FIG. 10 shows a further alternative embodiment of the toggle joint 180, wherein an elastomeric element 311 is arranged at the second leg 185 of the toggle joint 180 to provide the restoring force. The elastomeric element 311 can act in a manner corresponding to the compression spring 301 described before.

A further alternative embodiment of the toggle joint 180 is shown in FIGS. 11a and 11b. The guiding slot 191 of the second leg 185 has a length L and a width Br (cf. FIG. 11c). Furthermore, the guiding slot comprises a first recess 321 having a width $Br_1$ at a position $Pos_1$ of the guiding slot and a second recess 323 having a width $Br_2$ at a position $Pos_2$ of the guiding slot. The width of the guiding slot is thus enlarged in the regions of the recesses 321, 323. In particular, the guiding projection 189 can come to lie in the first recess 321 when the flap 103 is in its open position (FIG. 11a) and can come to lie in the second recess 323 when the flap 103 is in the closed position $P_S$ (FIG. 11b). In particular, the interaction between the guiding projection 189 and the second recess 323 can cause a restoring force in the closing direction. Furthermore, the interaction of the guiding projection 189 with the first recess 321 can cause a retaining force on the flap 103 in its open position. Furthermore, combinations of the variants of the toggle joint 180 shown are conceivable. In particular, combinations of any elastic element and one leg of the toggle joint 180 with one, two, or more recesses are possible.

An exemplary actuating path SW is schematically shown in FIG. 12. The actuating path SW extends from the open position $P_O$ to the closed position $P_S$. Furthermore, the actuating path SW comprises the two regions $B_1$ and $B_2$. The elastic element causes a restoring force in the direction of the closing direction, wherein the latter can be different from 0 only in a partial region of the actuating path before and/or about the closed position $P_S$ of the flap. For example, the elastic element is arranged and adapted in such a manner that it causes a restoring force during the closing movement from the open position to the closed position $P_S$ only after reaching region $B_2$ at position $P_1$. The region $B_2$ can be reached, for example, only after passing through 40% to 90% of the entire actuating path SW. The spring tension of the elastic element can then increase during the further closing movement in the region $B_2$ and reach a maximum at position $P_2$ which is situated, for example, in the region from 70% to 100% of the actuating path, wherein 0% of the actuating path corresponds to the open position $P_O$ and 100% of the actuating path corresponds to the closed position $P_S$. It is advantageous, in particular, when the maximum of the spring force of the elastic element is in the range from 70% to 95% of the actuating path SW. The spring force increasing in the closing direction acts against inadvertent opening of the closed flap 103. The maximum of the spring force can correspond, in particular, to a parallel orientation of the first leg 183 relative to the second leg 185. The restoring force acting on the flap 103 via the linkage mechanism 110, or the toggle joint 180, can continuously increase in the closing direction. Alternatively, the restoring force can be applied by the elastic element over the entire actuating path SW and can continuously increase in the direction towards the closed position $P_S$.

The flap 103 can thus be maintained in the closed position P$_S$ even when the actuating drive 5 for actuating the flap 103 is deactivated. Furthermore, the flap 103 can be moved into a region B$_3$ beyond the closed position P$_S$ by means of the application of an external force F$_{ext}$. The region B$_3$ can also be limited by an end stop at a position P$_3$. For example, the position P$_3$ corresponds to a fully compressed seal on the frame 105 of the flap 103, such as a fully compressed sealing lip.

An exemplary electronic circuit 400 of the DMS sensor 207 is schematically shown in FIG. 13. The circuit 400 can be arranged, for example, on the sensor printed circuit board 115 and comprises a bridge circuit 401 having four bridge resistors R$_1$ to R$_4$. An input of the bridge circuit 401 is connected to the supply voltage V$_{bat}$, while an output of the bridge circuit 401 is connected to ground GND. To pick off the measuring signal, a first bridge leg 401a is connected to a first input 403a of an operational amplifier 403 and a second bridge leg 401b is connected to a second input 403b of the operational amplifier 403. An output 403c of the operational amplifier 403 is coupled to an analog-digital converter 405. An analog voltage value can be converted to a digital signal by the analog-digital converter 405. To process the digital signal the analog-digital converter 405 can optionally be connected to a logic circuit 407. Finally, the sensor signal can be provided at an output of the analog-digital converter 405 or at an output of the logic circuit 407 and can be fed to the control circuit 3, for example, via a cable connection, as shown in FIGS. 3 and 3a to 3c.

FIG. 13 also shows an optional further embodiment of the exemplary sensor circuit: to compensate a voltage offset U$_{off}$, one of the bridge legs, the first bridge leg 401a in the example shown, is connected to a digital-analog converter 411 or a pulse width modulation (PWM) via a high-value resistor 5. The offset U$_{off}$ of the bridge voltage can thus be compensated by means of the PWM, or the digital-analog converter 411, so that a corresponding signal is applied to the operational amplifier 403 for example. It can be provided, for example, to set the offset compensation in such a manner that a voltage of 0 volts is applied to the operational amplifier 403 in the force-free state of the strain gauge 209. A tolerance range, for example in the range of +/−10 µV, can be provided. In particular, the offset compensation can be dynamic. A temperature drift or a drift of the bridge voltage due to an ageing process can thus be compensated, for example. The high-value resistor R$_5$ can have a resistance value in the range from 100 kΩ to 10 MΩ. In some embodiments, the resistor R$_5$ can be a protective resistor.

Finally, the sensor signal can be provided at a sensor signal output 413 and fed to the control circuit 3, for example via a cable connection, as shown in FIGS. 3 and 3a to 3c. In the example shown, the sensor signal output 413 is an output associated with the logic circuit 407. Alternatively, the logic circuit 407 can also be omitted, with its functionality then taken over by the control circuit 3. The sensor signal output can then be provided by the analog-digital converter 405.

A use of a flap actuator 1 for an automotive loading flap is illustrated in FIG. 14. The flap 103 serves as a cover for a loading device of an electrically driven automotive vehicle 501. To load the energy storage at a charging station 507, a connector 505 of the charging station can be connected to a charging socket of the automotive vehicle closable by the flap 103. A user can trigger a sensor signal of the DMS sensor 207 by exerting an external force F$_{ext}$ on the flap 103 for example by means of a hand 507 so that the control circuit 3 controls the actuating drive 5 for opening the flap 103.

The diagram shown in FIG. 15 illustrates an exemplary behavior of the sensor signal voltage U$_S$ as a function of time t, for example for the DMS sensor 207 in the flap actuator 1 with the electrically drivable flap 103.

At time to, the flap 103 is in the open state. For t>t$_0$, the flap 103 is closed by means of the actuating drive 5, wherein a force is exerted on the DMS sensor 207 at time t$_1$ and increases up to time t$_2$. When the first voltage threshold value U$_1$ is reached, the control circuit 3 detects that the flap 103 has reached the closed position P$_S$. Herein, it can be additionally checked whether the sensor signal voltage U$_S$ is within a first voltage range defined by the first voltage threshold value U$_1$ and a second voltage threshold value U$_2$. The second voltage threshold value U$_2$ is higher than the first voltage threshold value U$_1$ so that U$_1$<U$_2$ applies. After it has been detected that the flap has reached the closed position P$_S$ the actuating movement of the flap 103 is stopped, the electric motor 7 of the actuating drive 5 is thus halted.

In particular, as shown, it can be advantageous when the flap 103 exerts a continuous force on the force sensor 15 in the closed position P$_S$ which can be maintained, for example, by means of one of the above-described elastic elements. Additionally or alternatively, the force can be maintained on the basis of a mechanical resistance of the actuating drive 5, in particular due to a transmission resistance and/or the blocking momentum of the electric motor 7. It can also be advantageous to use an electric motor with an irreversible transmission, for example with a worm gear. In some embodiments, the force can also be generated by means of a locking mechanism, for example by means of a locking pin. The locking mechanism can lock, for example, the flap 103 in the closed state, wherein the locking is performed in a position in which a force is exerted on the force sensor 15.

The behavior of the sensor signal voltage U$_S$ shown in FIG. 15 shows a further increase from a time point t$_3$. This increase can be, in particular, due to an external force. For example, a user can exert a pressure to move the flap 103 in the closing direction beyond the closed position P$_S$. For example, the movement can be against a further elastic element, such as a rubber seal of the flap. Alternatively, the flap actuator can be designed such that an external force on the flap 103 results in a movement or elastic deformation of the frame 105 or a component carrying the frame 105 and further the force is transmitted to the force sensor 15 by the frame or the component.

Due to the external force, the sensor signal voltage U$_S$ is further increased up to time point ta. The sensor signal voltage U$_S$ can then be compared to a third voltage threshold value U$_3$. If the sensor signal voltage now reaches or exceeds the third voltage threshold value, the external force can also be detected as the actuation of a switch. In response to the detection of the actuation of the switch, the control or feedback-control function can be performed. In particular, it can be provided that the actuating drive 5 is controlled for opening the flap 103 in response to the third voltage threshold value being reached. It can also be provided that the sensor signal voltage U$_S$ is compared to a second voltage range. The second voltage range is defined by the third voltage threshold value U$_3$ and a fourth voltage threshold value U$_4$, wherein U$_4$>U$_3$ applies. In particular, it can be provided that the following applies for the voltage threshold values: U$_4$>U$_3$>U$_2$>U$_1$.

During the opening of the flap, the sensor signal voltage $U_S$ is reduced again ($t > t_5$). As soon as the flap has been opened sufficiently so that there is no further force application on the force sensor 15 ($t > t_6$) the sensor signal voltage $U_S$ is reduced to its lower level, for example to 0 V.

A corresponding exemplary method for operating the flap actuator 1 is shown as a flowchart in FIG. 16. In a first step S1 the sensor signal (sensor signal voltage $U_S$) is received by the control circuit 3. This can be, for example, continuously or at intervals. In a second step S2, the sensor signal voltage $U_S$ is compared to the first voltage threshold value by the control circuit. If the value of the sensor signal voltage $U_S$ is larger than the first voltage threshold value $U_1$, reaching of the closed position of the flap 103 is detected. Alternatively, it can be additionally checked whether the sensor signal voltage $U_S$ is smaller than the second voltage threshold value $U_2$, thus whether the sensor signal value is in the first voltage range, where $U_1 < U_S < U_2$. When the comparison results in $U_1 < U_S$, or when $U_1 < U_S < U_2$ is fulfilled, reaching of the closed position of flap 103 is detected in step S3. When the flap 103 is in its closed position, the sensor signal continues to be received by the control circuit 3 and the sensor signal voltage $U_S$ is evaluated. As shown in step S4, the sensor signal voltage $U_S$ is compared to the third voltage threshold value $U_3$, or is compared to the second voltage range defined by the third voltage threshold value $U_3$ and the fourth voltage threshold value $U_4$. If the comparison results in $U_S > U_3$, or $U_3 < U_S < U_4$, the control circuit 3 detects the actuation of the switch in step S5 and in response thereto controls the actuating drive 5 to actuate the flap 103 in step S6. In particular, it can be provided that the control circuit 3 controls the actuating drive 5 to actuate the flap position to the open position.

A method step S7 can also be provided to output an error message and/or to actuate the flap 103 to a safety position or to the closed position $P_S$ when $U_S < U_1$, or $U_S > U_4$, is detected. In particular, the actuating drive 5 can be driven to actuate the flap 103 in the closing direction if the last actuating operation performed was changing the flap position to the closed position $P_S$ and it is detected that $U_S < U_1$. In addition, it can be checked in this case whether $U_S < U_1$ is fulfilled over a predetermined period of time, whereby the actuating drive 5 is only driven to close the flap 103 when $U_S < U_1$ is fulfilled over this period of time.

In particular, the voltages, voltage threshold values and ranges mentioned above can also be defined in or regarded as magnitudes. Alternatively, any other voltage threshold values and voltage ranges can also be defined, insofar as this is reasonable from an engineering point of view.

The closed position $P_S$ of the flap 103 can thus be monitored. If temporary actuation of the flap 103 from the closed position $P_S$ in the opening direction, for example by vibrations or other external forces, is not corrected by the restoring force of the elastic element 195a, 195b, the actuating drive 5 can be activated and the flap 103 can be actively closed and/or an error message can be output.

The above-described embodiments according to the present invention and the figures only serve for purely exemplary illustration. The configuration of the invention can vary without changing the underlying functional principle. The scope of protection of the flap actuator according to the invention is solely defined by the following claims.

LIST OF REFERENCE NUMERALS 1 flap actuator
3 control circuit 5 actuating drive
7 electric motor
9 motor driver
11 bus interface
12 data bus
13 sensor signal input
15 force sensor
17 GPIO (General Purpose In/Out) interface
19 switch
20 wake-up input
21 analog input and output (AIN)
23 temperature sensor
25 further output
27 second electric device
29 actuator
31 LED assembly
33 second analog input
35 light sensor
37 third analog input
39 further sensor
101 charging flap actuator system
103 flap
105 frame
107 back wall
108 opening
109 seal
110 linkage mechanism
111 base component
113 recess of base component
115 fixing part
117 opening
119 connector
121 connector (on frame)
123 wire connection
125 connector (on frame)
141 trapezoidal linkage
143 rotary bearing (on flap, support of pivot arm 145)
145 first pivot arm
147 output shaft
148 couplings of output shaft
149 housing (of actuating drive)
150 opening of housing
153 rotary bearing
155 curved pivot arm
157 rotary bearing on base component (for curved pivot arm 155)
180 toggle joint
183 first leg
185 second leg
186 first rotation point
187 second rotation point
189 guiding projection
191 guiding slot
193 third rotation point
195 recess
197 torsion spring
197a first spring arm
197b second spring arm
199 projection
205 projection
207 DMS sensor
209 cover
211 sensor printed circuit board
213 sensor circuit
215 connector
217 leaf spring
219 casting material

17

301 compression spring
303 cover (compression spring)
311 elastomeric element
321 first recess
323 second recess
400 circuit
401 bridge circuit
403 operational amplifier
403*a* first input of operational amplifier 403
403*b* second input of operational amplifier 403
403*c* third input of operational amplifier 403
405 analog-digital converter
407 logic circuit
411 digital-analog converter
413 sensor signal output
501 automotive vehicle
503 charging column
505 connector
507 hand
A distance
B$_1$, B$_2$ regions of the actuating path
B$_3$ region
Br width
Br$_1$, Br$_2$ width
F$_{ext}$ external force
L length
GND ground
Pos$_1$, Pos$_2$ positions along guiding slot
P$_O$ open position
P$_S$ closed position
P$_1$ first position along actuating path
P$_2$ second position along actuating path
P$_3$ position of end stop
R$_1$, R$_2$, R$_3$, R$_4$ bridge resistors
R$_5$ high-value resistor
SW actuating path
S1 to S6 method steps
t$_0$ to t$_6$ time points
U$_S$ sensor signal voltage
U$_1$ first voltage threshold value
U$_2$ second voltage threshold value
U$_3$ third voltage threshold value
U$_4$ fourth voltage threshold value
U$_{off}$ voltage offset
U$_{ref}$ reference value of sensor signal voltage
V$_{bat}$ supply voltage

What is claimed is:

1. A flap actuator, comprising a flap, an actuating drive for actuating the flap along an actuating path from a closed position to an open position, and a linkage mechanism, the linkage mechanism comprising a toggle joint having a first leg and a second leg, wherein the first leg is rotatably supported at a first rotation point, the second leg is rotatably supported via a second rotation point, and the first leg and the second leg are rotatably linked to each other at a moveable third rotation point, wherein;

the second leg includes a guiding slot along a longitudinal direction of the second leg and the first leg includes a guiding projection engaging the guiding slot, wherein the guiding projection forms the third rotation point and is supported in the guiding slot to be moveable along the longitudinal direction;

wherein the toggle joint comprises an elastic element which, when the flap is in its closed position, exerts a force on the toggle joint so that the toggle joint causes a restoring force on the flap in towards the closed position; and/or

wherein the guiding slot has a length L and a width Br, wherein L>Br, and the second leg, at a position Pos2 along the longitudinal direction of the guiding slot at which the guiding projection is situated when the flap is in its closed position, includes a second recess having a width Br2, wherein Br2>Br, and wherein the guiding projection, when the flap is in its closed position, is in at least partial engagement with the second recess so that the toggle joint causes a retaining force and/or a restoring force on the flap in the closing direction.

2. The flap actuator according to claim 1, wherein the flap actuator comprises an actuating drive comprising an electric motor.

3. The flap actuator according to claim 1, wherein the elastic element comprises a spring element or an elastomeric element.

4. The flap actuator according to claim 1, wherein the second flap, at a position Pos1 along the longitudinal direction of the guiding slot, at which the guiding projection is situated when the flap is in its closed position, includes a first recess having a width Br1, wherein Br1>Br, and the guiding projection, when the flap is open, is in at least partial engagement with the first recess.

5. The flap actuator according to claim 1, wherein the elastic element is arranged at the second leg and, when the flap is in its closed position, exerts a force on the guiding projection so that the toggle joint causes a restoring force on the flap in the closing direction.

6. The flap actuator according to claim 1, wherein the actuating path comprises a first region extending from the open position to a first position, wherein the first position is situated between the open position and the closed position of the flap, and wherein the actuating path comprises a second region extending from the first position to the closed position of the flap, wherein the elastic element does not exert any force on the toggle joint when the flap position is in the first region of the actuating path and the elastic element exerts a force on the toggle joint when the flap position is in the second region of the actuating path.

7. The flap actuator according to claim 1, wherein the elastic element comprises a compression spring, wherein the compression spring is arranged at the first leg or at the second leg of the toggle joint and exerts a force on the toggle joint so that the toggle joint exerts a restoring force in the closing direction on the flap when the latter is in its closed position.

8. The flap actuator according to claim 1, wherein the elastic element comprises a torsion spring, wherein the torsion spring is arranged at the first rotation point of the first leg or at the second rotation point of the second leg and exerts a force on the first leg or on the second leg so that the toggle joint exerts a restoring force in the closing direction on the flap when the latter is in its closed position.

9. The flap actuator according to claim 8, wherein the torsion spring, at its one end, includes a first arm which is held by or is fixed on the frame of the flap, and wherein torsion spring, at its other end, has a second arm which bears against the first leg or the second leg of the toggle joint.

10. The flap actuator according to claim 9, wherein:
the torsion spring is arranged at the first rotation point of the first leg, wherein the first leg includes a retaining projection, or in that the torsion spring is arranged at the second rotation point of the second leg, wherein the second leg includes a retaining projection; and
the second arm bears against the retaining projection to transmit the spring force to the toggle joint.

11. The flap actuator according claim 1, wherein the flap is operable into a third region, the third region extending from the closed position beyond the closed position in the closing direction, wherein the elastic element exerts a force on the toggle joint when the flap is in the third region so that a restoring force in the closing direction is caused on the flap.

12. The flap actuator according to claim 11, wherein an elastic seal is arranged between the flap and the frame and in that the seal is compressed when the flap is actuated beyond the closed position.

13. The flap actuator according to claim 1, wherein the flap actuator comprises a force sensor, which is arranged at a frame supporting the flap and has a force applied to it by the flap when the latter is in the closed position.

14. The flap actuator according to claim 13, wherein the force sensor is arranged on the frame of the flap and the flap includes a projection arranged on an inside of the flap and in contact with the force sensor when the flap is in the closed position.

15. The flap actuator according to claim 14, wherein the flap and the force sensor are arranged relative to each other in such a manner that the force is increased on the force sensor when the flap is further actuated from the closing position in the closing direction.

16. The flap actuator according to claim 13, wherein the force sensor comprises at least one strain gauge or at least one piezoelectric sensor or at least one MEMS sensor.

17. The flap actuator according to claim 16, wherein the force sensor is arranged on a spring element and is fixedly connected to the latter, wherein the flap contacts the spring element in its closed position and wherein a force applied to the spring element by the flap is transmitted to the force sensor.

18. The flap actuator according to claim 17, wherein the flap actuator comprises a force sensor arranged on the flap or on the frame and a control circuit coupled to the force sensor for the exchange of sensor data, wherein the control circuit is adapted to receive and evaluate the sensor data, wherein the control circuit is further adapted to compare the sensor data to a first threshold value and to detect the closed position of the flap based on the comparison.

19. The flap actuator according to claim 18, wherein an external force acting on the closed flap is detectable by the force sensor, wherein the control circuit is adapted to change a switching state of a switch as a function of the detected force.

20. The flap actuator according to claim 19, wherein control circuit is adapted to control the flap actuator for opening the flap when the application of an external force is detected when the flap is in its closed position.

* * * * *